(12) United States Patent
Shigemizu et al.

(10) Patent No.: US 8,963,501 B2
(45) Date of Patent: Feb. 24, 2015

(54) VOLTAGE EQUALIZATION DEVICE, METHOD, PROGRAM, AND POWER STORAGE SYSTEM

(75) Inventors: Tetsuro Shigemizu, Nagasaki (JP); Takehiko Nishida, Nagasaki (JP); Katsuo Hashizaki, Nagasaki (JP); Masaaki Minami, Nagasaki (JP); Keiichiro Tanaka, Nagasaki (JP); Kazuyuki Adachi, Fukuoka (JP); Shinji Murakami, Fukuoka (JP); Kouji Kurayama, Fukuoka (JP); Hirofumi Fujita, Fukuoka (JP)

(73) Assignees: Mitsubishi Heavy Industries, Ltd., Tokyo (JP); Kyushu Electric Power Co., Inc, Fukuoka-shi (JP)

( * ) Notice: Subject to any disclaimer, the term of this patent is extended or adjusted under 35 U.S.C. 154(b) by 783 days.

(21) Appl. No.: 13/131,990

(22) PCT Filed: Dec. 2, 2009

(86) PCT No.: PCT/JP2009/070235
§ 371 (c)(1),
(2), (4) Date: Jul. 21, 2011

(87) PCT Pub. No.: WO2010/067735
PCT Pub. Date: Jun. 17, 2010

(65) Prior Publication Data
US 2011/0279085 A1   Nov. 17, 2011

(30) Foreign Application Priority Data
Dec. 9, 2008  (JP) ................................. 2008-313523

(51) Int. Cl.
*H02J 7/00* (2006.01)
*H01M 10/44* (2006.01)
*H02J 7/04* (2006.01)

(52) U.S. Cl.
CPC ........... *H01M 10/441* (2013.01); *H02J 7/0016* (2013.01); *H02J 7/045* (2013.01)
USPC ........................................................ 320/126

(58) Field of Classification Search
CPC .............................. H02J 7/0016; H02J 7/1423
USPC ........................................ 320/118, 119, 126
See application file for complete search history.

(56) References Cited

U.S. PATENT DOCUMENTS 5,818,200 A * 10/1998 Cummings et al. ............ 320/116
6,864,666 B2 * 3/2005 Breen et al. .................... 320/135
(Continued)

FOREIGN PATENT DOCUMENTS

JP   2000-116014 A   4/2000
JP   2003-111288 A   4/2003
(Continued)

OTHER PUBLICATIONS

The Notice of Allowance has been received in corresponding Chinese Patent Application No. 200980147949.1, dated Dec. 25, 2013, (2 pages). Statement of Relevancy—"The Notice of Allowance has been received."
Korean Notice of Allowance dated Nov. 15, 2012, issued in corresponding Korean Patent Application No. 10-2011-7012307, w/ English translation.
(Continued)

*Primary Examiner* — Edward Tso
(74) *Attorney, Agent, or Firm* — Westerman, Hattori, Daniels & Adrian, LLP

(57) ABSTRACT

A voltage equalization device of a power storage device provided with battery packs in which a plurality of secondary cells are connected, power converters provided in association with the battery packs, and controllers that control the power converters, and in which the battery packs are connected in parallel via the individual power converters includes a decision portion and a voltage-adjusting portion. The decision portion obtains battery-pack information regarding the states of charge/discharge of the individual battery packs and decides, for each battery pack, whether or not to perform voltage adjustment on the basis of the battery-pack information. When the decision portion decides that the voltage adjustment is to be performed, the voltage-adjusting portion generates offset instructions for adjusting the states of charge/ discharge and outputs the offset instructions to the controllers of the power converters associated with the battery packs.

4 Claims, 7 Drawing Sheets

(56) References Cited

U.S. PATENT DOCUMENTS

| | | | |
|---|---|---|---|
| 6,977,482 B2* | 12/2005 | Popescu-Stanesti et al. | 320/116 |
| 7,202,631 B2* | 4/2007 | Breen et al. | 320/132 |
| 7,782,013 B2* | 8/2010 | Chang | 320/116 |
| 7,982,430 B2* | 7/2011 | Breen et al. | 320/128 |
| 8,154,257 B2* | 4/2012 | Hori et al. | 320/162 |
| 8,575,896 B2* | 11/2013 | Greening et al. | 320/126 |
| 2003/0062874 A1 | 4/2003 | Furukawa | |
| 2008/0258683 A1 | 10/2008 | Chang | |
| 2008/0272736 A1* | 11/2008 | Tien et al. | 320/126 |

FOREIGN PATENT DOCUMENTS

| | | | |
|---|---|---|---|
| JP | 2007-274832 A | 10/2007 | |
| KR | 10-2006-0052593 A | 5/2006 | |

OTHER PUBLICATIONS

Korean Office Action dated Nov. 15, 2012, issued in corresponding Korean Patent Application No. 10-2011-7012307, w/ English translation.

International Search Report for PCT/JP2009/070235, mail date of Feb. 9, 2010.

Notice of Allowance dated Jun. 26, 2013, issued in corresponding Korean Patent Application No. 10-2011-7012307 (3 pages). (Statement of Relevancy—"Notice of Allowance has been received").

* cited by examiner

VOLTAGE EQUALIZATION DEVICE, METHOD, PROGRAM, AND POWER STORAGE SYSTEM

TECHNICAL FIELD

The present invention relates to a voltage equalization device, method, and program, as well as to a power storage system.

BACKGROUND ART

In the related art, when increasing the capacity of lead-acid batteries, single batteries or battery packs formed by connecting single batteries in series (a battery pack may have not only portions connected in series but also portions connected in parallel) are connected in parallel as shown in FIG. 6. For example, vehicle lead-acid batteries or the like generally have a large resistance of about 10 mΩ and, even if there are slight voltage differences caused by impedance or contact resistance due to manufacturing variations, the voltage differences are absorbed by this resistance, thus keeping the current bias in the individual batteries small.

In recent years, however, more efficient secondary cells, such as lithium-ion batteries or the like, having lower internal impedance than conventional ones are becoming available, and when batteries are directly connected in parallel in this case, slight differences in impedance or contact resistance due to variability in manufacturing may cause excessively large current to flow at one side of the battery packs. Thus, in recent years, power converters are connected to battery packs, as shown in FIG. 7, and an overcurrent is prevented from flowing in the battery packs by controlling the current that flows in the individual battery packs with the power converters.

CITATION LIST

Patent Literature

{PTL 1} Japanese Unexamined Patent Application, Publication No. 2003-111288.

SUMMARY OF INVENTION

Technical Problem

Even if the power converters are provided in association with the individual battery packs, as shown in FIG. 7, however, variability in battery conditions inevitably arises among battery packs, and there is a problem in that it is difficult to use the individual battery packs in preferable conditions by keeping the state of charge, etc. of the respective battery packs within a predetermined range.

The present invention has been conceived in order to solve the above-described problems, and an object thereof is to provide a voltage equalization device, method, and program, as well as a power storage system, that are capable of equalizing the state of charge of battery packs connected in parallel.

Solution to Problem

In order to solve the above-described problems, the present invention employs the following solutions.

The present invention provides a voltage equalization device for a power storage device provided with battery packs in which a plurality of secondary cells are connected, power converters provided in association with the battery packs, and controlling means for controlling the power converters, and in which the battery packs are connected in parallel via the individual power converters, the voltage equalization device including deciding means for obtaining battery-pack information regarding states of charge/discharge of the individual battery packs and for deciding, for each battery pack, whether or not to perform voltage adjustment on the basis of the battery-pack information; and voltage-adjusting means for generating, when the deciding means decides that the voltage adjustment is to be performed, offset instructions for adjusting the states of charge/discharge and for outputting the offset instructions to the controllers of the power converters associated with the battery packs.

With such a configuration, in the power storage device in which the plurality of the battery packs are connected in parallel via the power converters, the deciding means decides, for each battery pack, whether or not to perform the voltage adjustment on the basis of the battery-pack information about the individual battery packs; when the deciding means decides that the voltage adjustment is to be performed, the voltage-adjusting means outputs the offset instructions for the voltage adjustment; and the power converters carry out charge/discharge control of the battery packs on the basis of the offset instructions. Accordingly, voltage of each battery pack can be controlled and voltage differences in the individual battery packs can be eliminated.

With the voltage equalization device described above, the deciding means may decide whether or not to perform voltage adjustment by comparing the individual items of battery-pack information with a predetermined threshold.

In this way, by comparing the individual items of battery-pack information with the predetermined threshold, whether or not to perform the voltage adjustment can be decided with a simple method.

The above-described voltage equalization device may include a plurality of bypass impedance elements that are connected in parallel with the battery packs; switching elements that are connected in series with the bypass elements; and switching-element controlling means for controlling the switching elements on the basis of the battery-pack information regarding the states of charge/discharge of the individual battery packs.

In this way, the bypass impedance elements are connected in parallel with the individual battery packs and the switching elements are connected in series with the bypass impedance elements; therefore, when the switching elements are turned on, voltages of the battery packs connected in parallel with the bypass impedance elements can be lowered. Accordingly, when the bypass impedance elements are turned on, it becomes possible to quickly lower the voltages as compared with lowering the voltages based only on the offset instructions output from the voltage-adjusting means. The bypass impedance elements described above are, for example, resistance components.

The above-described voltage equalization device may include a plurality of bypass impedance elements that are provided for individual unit cells constituting the battery packs or for each cell group formed by dividing the battery packs into a plurality of groups; switching elements that are connected in series with the bypass impedance elements; and switching-element controlling means for controlling the switching elements on the basis of the battery-pack information regarding the states of charge/discharge of the individual battery packs.

In this way, the bypass impedance elements are connected in parallel with each of the individual cells that constitute the individual battery packs or with each of cell groups formed by dividing the battery packs into the plurality of groups, and the switching elements are connected in series with the bypass impedance elements; therefore, when the switching elements are turned on, voltages of the battery packs connected in parallel with the bypass impedance elements can be lowered. Accordingly, by controlling the bypass impedance elements provided for each of the individual cells that constitute the battery packs or for each of cell groups formed by dividing the battery packs into the plurality of groups, it becomes possible to quickly lower the voltage for each cell or each cell group.

The present invention provides a power storage system provided with a power storage device that includes battery packs in which a plurality of secondary cells are connected, power converters individually provided for the battery packs, and controlling means for controlling the power converters, and in which the battery packs are connected in parallel via the individual power converters; and a voltage equalization device according to one of claims 1 to 4.

The present invention provides a voltage equalization device for a power storage device provided with battery packs in which a plurality of secondary cells are connected and power converters provided in association with the battery pack, and in which the battery packs are connected in parallel via the individual power converters, wherein one of the battery packs is connected in parallel with other battery packs other than the one battery pack via an impedance element.

With such a configuration, in the power storage device in which the plurality of the battery packs are individually connected in parallel via the power converters, one of the battery packs and the other battery packs other than the one battery pack are connected in parallel via the impedance element. Therefore, when there are voltage differences between the connected battery packs, current flows through the impedance elements connected so as to eliminate the voltage differences. As a result, voltage for each battery pack is controlled and it becomes possible to eliminate the voltage differences between the battery packs.

In the above-described voltage equalization device, adjacent battery packs may be connected in parallel with each other via impedance elements, and two battery packs located at both ends are connected in parallel via an impedance element.

With the above-described configuration, the adjacent battery packs are connected in parallel with each other via the impedance elements and the two battery packs located at both ends are connected via the impedance element; therefore, the battery packs can be connected with each other in a ring-like manner via the impedance elements. Accordingly, as compared with connecting one of the battery packs with the other battery packs via the impedance element, the number of current route communicating from the high-voltage battery packs to the low-voltage battery packs can be increased and the efficiency of the voltage equalization can be enhanced.

In the above-described voltage equalization device, the battery packs among the plurality of the battery packs that are not adjacent to each other may be connected in parallel with each other via impedance elements.

Because the battery packs among the plurality of the battery packs that are not adjacent to each other are connected with each other via the impedance elements in this way, the number of current routes communicating from the high-voltage battery packs to the low-voltage battery packs can be further increased and the efficiency of the voltage equalization can be further enhanced.

The above-described voltage equalization device may include switching elements that are connected in series with the impedance elements; and switching-element controlling means for obtaining respective battery-pack information for the battery packs and for controlling the switching elements on the basis of the battery-pack information.

With such a configuration, by turning on the switching elements on the basis of the individual items of the battery-pack information obtained from the individual battery packs, it becomes possible to perform charging/discharging of the battery packs via the impedance elements. Accordingly, it becomes possible to selectively perform charging/discharging of the battery packs via the impedance elements.

In the above-described voltage equalization device, the switching-element controlling means may perform on/off control of the switching elements by comparing the battery-pack information with a predetermined threshold.

In this way, by deciding whether or not to perform the on/off control of the switching elements by comparing the individual items of battery-pack information with the predetermined threshold, it becomes possible to selectively perform the voltage adjustment only for the battery packs with large voltage differences.

The present invention provides a voltage equalization method for a power storage device provided with battery packs in which a plurality of secondary cells are connected, power converters provided in association with the battery packs, and controlling means for controlling the power converters, and in which the battery packs are connected in parallel via the individual power converters, the voltage equalization method including a deciding step of obtaining battery-pack information regarding state of charge/discharge of the individual battery packs and deciding, for each battery pack, whether or not to perform voltage adjustment on the basis of the battery-pack information; and an outputting step of generating, when it is decided in the deciding step that the voltage adjustment is to be performed, offset instructions for adjusting the states of charge/discharge and outputting the offset instructions to the controllers of the power converters associated with the battery packs.

The present invention provides voltage equalization program to be applied to a voltage equalization device of a power storage device provided with battery packs in which a plurality of secondary cells are connected, power converters provided in association with the battery packs, and controlling means for controlling the power converters, and in which the battery packs are connected in parallel via the individual power converters, the voltage equalization program causing a computer to execute decision processing for obtaining battery-pack information regarding state of charge/discharge of the individual battery packs and deciding, for each battery pack, whether or not to perform voltage adjustment on the basis of the battery-pack information; and outputting processing of generating, when it is decided in the decision processing that the voltage adjustment is to be performed, offset instructions for adjusting the states of charge/discharge and outputting the offset instructions to the controllers of the power converters associated with the battery packs.

The present invention provides a voltage equalization method for a power storage device with battery packs in which a plurality of secondary cells are connected, and power converters provided in association with the battery packs, and in which the battery packs are connected in parallel via the individual power converters, wherein one of the battery packs and other battery packs other than the one battery pack are connected in parallel via an impedance element.

Advantageous Effects of Invention

With the present invention, an advantage is afforded in that the state of charge can be equalized among battery packs.

DESCRIPTION OF EMBODIMENTS

Embodiments of a voltage equalization device according to the present invention will be described below with reference to the drawings. Here, cases in which voltage equalization devices of the present invention are applied to power storage systems will be described as the embodiments of the present invention.

First Embodiment

Figure 1:
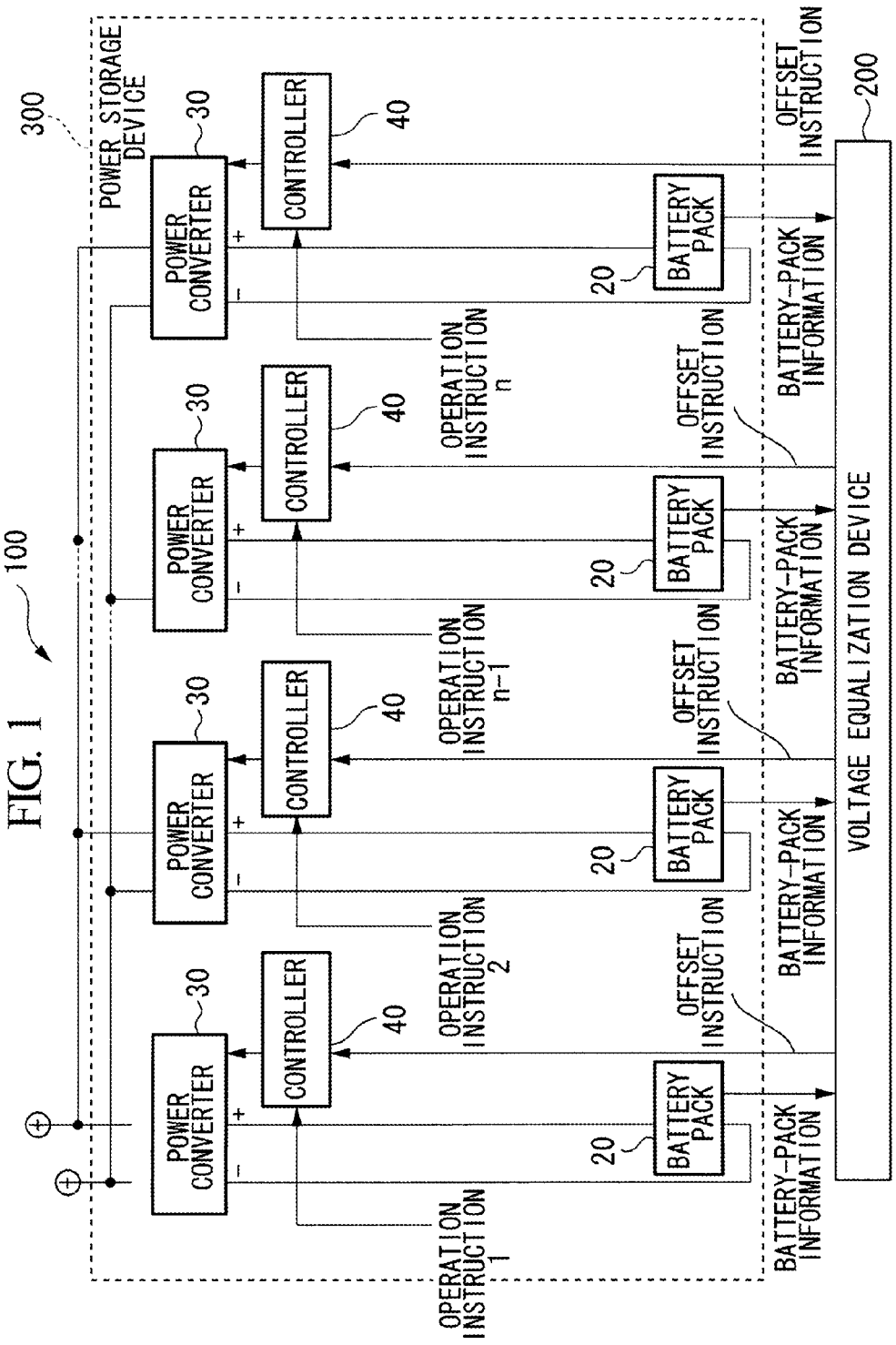
FIG. 1 is a block diagram showing, in outline, a power storage system according to a first embodiment of the present invention.

FIG. 1 is a block diagram showing, in outline, the configuration of a power storage system 100 according to a first embodiment. As shown in FIG. 1, the power storage system 100 is provided with a power storage device 300 and a voltage equalization device 200, and the voltage equalization device 200 of this embodiment equalizes voltages by controlling the amounts of charging/discharging of the power storage system 300.

In addition, in order to enhance the reliability and safety of the power storage device 300, the power storage system 100 is provided with protection circuits (not shown) that respectively perform over-charging protection, over-discharging protection, overcurrent protection, over-heating protection, etc. for the cells.

The power storage device 300 is provided with battery packs 20 in which at least one secondary cell is connected, power converters 30 provided in association with the individual battery packs 20, and controllers (controlling means) 40 that control the power converters 30, and is configured such that the individual battery packs 20 are connected in parallel via the individual power converters 30 and so that the individual battery packs 20 and the voltage equalization device 200 can communicate with each other. The battery packs 20 are formed of, for example, lithium-ion batteries, nickel-cadmium batteries, nickel hydrogen batteries, or the like.

The battery packs 20 are basically formed of single batteries or a plurality of single batteries that are connected in series. Note that, connections of the single batteries may have not only portions connected in series but also portions connected in parallel.

The battery packs 20 are individually connected in parallel via the power converters 30 provided in association with the individual battery packs 20, and battery-pack information measured by each battery pack is output to the voltage equalization device 200 (details thereof to be described later). The battery-pack information to be measured includes information regarding, for example, inter-terminal voltages of the individual battery packs, SOC (state of charge:charged power level indicated as a ratio relative to the power capacity), which indicates the state of charge of the battery packs, and so on.

The controllers 40 generate voltage-control instructions on the basis of offset instructions calculated by the voltage equalization device 200 and externally input operation instructions, and output them to the individual power converters 30.

The power converters 30 are driven on the basis of the voltage-control instructions received from the controllers 40 to thereby perform charging/discharging of the battery packs connected thereto.

For example, the power converters 30 are provided with a plurality of switching elements (for example, thyristors, IGBTs, power MOSTFETs, or the like), and these switching elements are driven to switch at predetermined timing on the basis of the voltage-control instructions received from the controllers 40 to thereby function as rectifiers that rectify AC power from a power grid and supply it to the power storage device 300 when charging the power storage device 300 and to function as inverters that convert the power from the power storage device 300 to AC power and output it to a load system or the like when discharging. In addition, by changing the duty ratio for switching on/off, the output power level for a certain period can be increased/decreased. Furthermore, the above-described power grid includes distributed power sources such as power plants based on wind power, fuel cells, MGT (micro gas turbines), solar power or the like, in addition to general commercial power plants.

Figure 2:
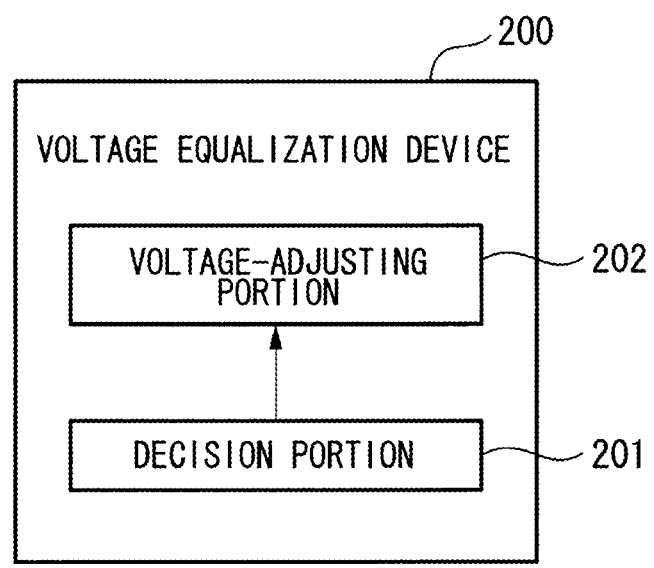
FIG. 2 is a block diagram showing the internal configuration of a voltage equalization device.

FIG. 2 is a block diagram showing the internal configuration of the voltage equalization device 200. The voltage equalization device 200 is provided with a decision portion (deciding means) 201 and a voltage-adjusting portion (voltage-adjusting means) 202.

The decision portion 201 obtains the battery-pack information regarding the state of charging/discharging of each battery pack 20 and decides, for each battery pack, whether or not to perform voltage adjustment on the basis of this battery-pack information. Specifically, the decision portion 201 compares a maximum value of inter-terminal voltage of each battery pack with a predetermined threshold and decides that the voltage adjustment should be performed when the maximum value is at the predetermined threshold or above.

When the decision portion 201 has decided that the voltage adjustment is to be performed, the voltage-adjusting portion 202 generates offset instructions for adjusting the state of charging/discharging and outputs the offset instructions to the power controllers 40 of the power converters associated with the battery packs. Specifically, of the battery information of the individual battery packs 20, the voltage-adjusting portion 202 outputs to the controllers 40 of the power converters associated with the individual battery packs the offset instructions for performing adjustments so as to reduce the voltages of the battery packs having relatively large inter-terminal voltage and to increase the voltages of the battery packs having relatively small inter-terminal voltages.

For example, defining the maximum value of the battery-pack information (for example, inter-terminal voltage or SOC) as $X_{max}$ and the information of target battery packs as $X_i$, the voltage-adjusting portion 202 specifies battery packs for which $X_{max}-X_i$ is equal to or greater than a predetermined threshold TH5 (hereinafter referred to as "Condition 1") and sets current $I_c$ ($I_c>0$: charging +) as the offset instructions for the controllers 40 of the power converters associated with the specified battery packs. Next, the voltage-adjusting portion 202 calculates a total current $SUMI_c$ ($SUMI_c<0$) of the offset instructions set for the battery packs that satisfy Condition 1 described above. For example, when the detected number of the battery packs that satisfy Condition 1 is α, the total current is obtained as $SUMI_c=\alpha\times I_c=\alpha I_c$. Then, the voltage-adjusting portion 202 determines the offset instructions for the individual battery packs that do not satisfy Condition 1 by dividing this $SUMI_c$ by the number of battery packs that do not satisfy the Condition 1. For example, when the number of battery packs that do not satisfy Condition 1 is β, the above-described total current $SUMI_c$ is divided by β, and to determine the offset instructions ($=SUMI_c/\beta$) for the battery packs that do not satisfy Condition 1.

Accordingly, current flows from the battery packs that do not satisfy Condition 1 to the battery packs that satisfy Condition 1, and thus, the states of charge of the individual battery packs are equalized.

Modification 1

With the power storage system in this embodiment, the offset instructions for the individual battery packs are determined at the voltage-adjusting portion 202 on the basis of the maximum value of the battery-pack information; however, instead of this method, the offset instructions for the individual battery packs may be determined, for example, on the basis of a minimum value of the battery-pack information.

Specifically, defining the minimum value of the battery-pack information (for example, inter-terminal voltage or SOC) as $X_{min}$ and information of the target battery packs as $X_i$, the voltage-adjusting portion 202 specifies battery packs for which $X_{min}-X_i$ is equal to or greater than a predetermined threshold TH6 (hereinafter referred to as "Condition 2") and sets current $I_c$ ($I_c>0$: charging +) as the offset instructions for the controllers 40 of the power converters associated with the specified battery packs. Next, the voltage-adjusting portion 202 calculates a total current $SUMI_c$ ($SUMI_c>0$) of the offset instructions set for the battery packs that satisfy Condition 2 described above. For example, when the detected number of the battery packs that satisfy Condition 2 is α, the total current is obtained as $SUMI_c=\alpha\times I_c=\alpha I_c$. Then, the voltage-adjusting portion 202 determines the offset instructions for the individual battery packs that do not satisfy Condition 2 by dividing this $SUMI_c$ by the number of battery packs that do not satisfy the Condition 2. For example, when the number of battery packs that do not satisfy Condition 2 is β, the above-described total current $SUMI_c$ is divided by β, and to determine the offset instructions ($=SUMI_c/\beta$) for the battery packs that do not satisfy Condition 2.

Accordingly, current flows from the battery packs that satisfy Condition 2 to the battery packs that do not satisfy Condition 2, and thus, the states of charge of the individual battery packs are equalized.

Modification 2

With the power storage system in this embodiment, the offset instructions for the individual battery packs are determined at the voltage-adjusting portion 202 on the basis of the maximum value of the battery-pack information; however, the offset instructions for the individual battery packs may be determined, for example, in the following manner. For example, defining an average value of the battery-pack information (for example, inter-terminal voltage or SOC) as $X_{avr}$ and information about the target battery packs as $X_i$, the offset instructions (charging) in accordance with the battery-pack information of the individual battery packs are set as: $I_c=(X_i-X_{avr})$.

In this case, for the battery packs whose battery information is larger than the average value, discharging is performed at current values in accordance with the magnitude of the battery-pack information, and, for the battery packs whose battery information is smaller than the average value, charging is performed at current values in accordance with the magnitude of the battery-pack information.

Note that, with the voltage equalization device according to this embodiment, the decision portion 201 decides whether or not to perform the equalization control by comparing the maximum value of the battery-pack information with the predetermined threshold; however, it is not limited to this. For example, the minimum value of the individual items of battery-pack information may be compared with the predetermined threshold, or the average value thereof may be compared with the predetermined threshold. In addition, difference information, such as the difference between a maximum value and an average value, the difference between a minimum value and the average value, the difference between the maximum value and the minimum value, and so on, may be compared with the predetermined threshold for the individual items of battery-pack information.

More specifically, the decision portion 201 may decide whether or not to perform the voltage adjustment in accordance with whether or not the maximum value $X_{max}$ of the inter-terminal voltage of the battery packs described above is equal to or greater than a predetermined threshold TH1 ($X_{max} \geq TH1$); whether or not the minimum value $X_{min}$ of the inter-terminal voltage of the battery packs is equal to or less than a predetermined threshold TH2 ($X_{min} \leq TH2$); whether or not a difference between the maximum value $X_{max}$ and the minimum value $X_{min}$ is equal to or greater than a threshold TH3 ($X_{max}-X_{min} \geq TH3$); or whether or not a larger value of a value determined by subtracting the average value $X_{avr}$ of the inter-terminal voltage of the battery packs from the maximum value $X_{max}$ thereof and a value determined by subtracting the minimum value $X_{min}$ of the inter-terminal voltage of the battery packs from the average value $X_{avr}$ thereof is equal to or greater than a predetermined threshold ($MAX(X_{max}-X_{avr}, X_{avr}-X_{min}) \geq TH4$).

Upon determining offset instructions required for equalizing the voltages of the individual battery packs on the basis of the battery-pack information obtained from the individual battery packs, the voltage-adjusting portion 202 outputs these offset instructions to the corresponding controllers 40.

Figure 3:
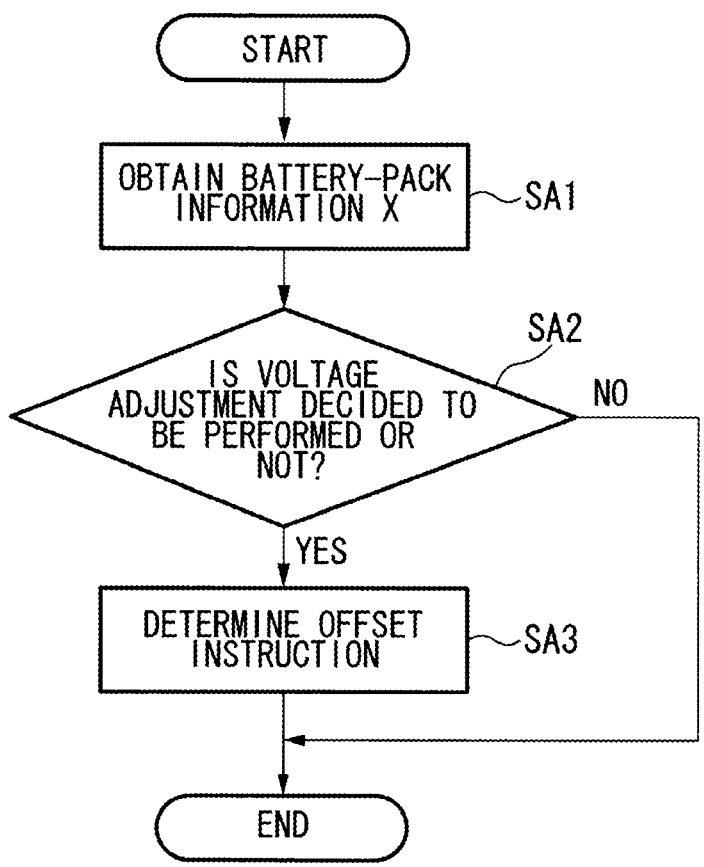
FIG. 3 is an operation flow chart of the power storage system according to the first embodiment of the present invention.

Next, the operation of the power storage system 100 according to this embodiment will be described using FIG. 3. First, the individual battery packs 20 calculate respective items of battery-pack information and output them to the voltage equalization device 200 (Step SA1 in FIG. 3). At the decision portion 201 of the voltage equalization device 200, the obtained individual items of battery-pack information are compared with the predetermined threshold; it is decided whether or not to perform the voltage adjustment; and the decision results are output to the voltage-adjusting portion 202 (Step SA2).

When it is decided at the decision portion 201 that the voltage adjustment is to be performed, at the voltage-adjusting portion 202, the offset instructions based on the battery-pack information about the individual battery packs are individually determined for the battery packs, and the determined offset instructions are sent to the controllers of the power converters associated with the respective battery packs (Step SA3). At the controllers 40, voltage-control instructions in which the obtained offset instructions and normal-operation instructions are combined are generated, and these voltage-control instructions are output to the power converters 30. At the power converters 30, the charging/discharging of the battery packs is controlled on the basis of the voltage-control instructions obtained from the controllers 40.

Note that, in the embodiment described above, processing by hardware is assumed for the voltage equalization device; however, there is no need to be limited to such a configuration. For example, a configuration in which processing is performed by separate software (a voltage equalization program) is also possible. In this case, the voltage equalization device is provided with a main storage device such as a CPU, RAM or the like and a computer-readable storage medium that stores a program for realizing all or part of the above-described processing. Then, the CPU reads out the program stored in the storage medium described above and executes processing and computational processing of the information, thereby realizing processing similar to that in the above-described fault diagnosis device.

Here, the computer-readable storage medium refers to a magnetic disk, a magneto-optical disk, a CD-ROM, a DVD-ROM, a semiconductor memory, or the like. In addition, this computer program may be distributed to computer via a communication line so that the computer that has received the distributed program executes the program.

As has been described above, with the voltage equalization device according to this embodiment, the individual battery packs 20 individually calculate the battery-pack information, and the decision portion 201 constituting the voltage equalization device 200 compares the battery-pack information with the predetermined threshold. Then, in accordance with the comparison results, the voltage-adjusting portion 202 generates the offset instructions, and the power converters 30 perform the charge/discharge control for the battery packs 20 on the basis of the offset instructions. Accordingly, the voltage can be controlled for each battery pack, and an advantage is afforded in that voltage differences in the individual battery packs are eliminated.

Second Embodiment

Next, a second embodiment of the present invention will be described using FIG. 4.

A voltage equalization device of this embodiment differs from the one in the first embodiment in that bypass impedance elements 10 are individually provided in parallel for each of the battery packs 20; the switching elements 11 are provided in series with the bypass impedance elements 10; and a voltage equalization device 200' is provided instead of the voltage equalization device 200. In the following, the voltage equalization device of this embodiment will be described with regard only to points that are different from the first embodiment, and the descriptions of points common therewith will be omitted.

The bypass impedance elements 10 are individually connected in parallel with the battery packs 20 and, furthermore, the switching elements 11 (details thereof to be described later) are connected in series to the bypass impedance elements 10. Here, the bypass impedance elements are, for example, resistance components.

The voltage equalization device 200' performs on/off control of the switching elements 11. When for example, the voltage of a certain battery pack 20 needs to be rapidly lowered, the voltage equalization device 200' turns on the switching element 11 connected in parallel with this battery pack 20, thereby flowing current in the bypass impedance element 10 connected in series with the switching element 11 that has been turned on. Accordingly, discharging of the battery pack 20 can be accelerated.

The voltage equalization device 200' is provided with the decision portion 201 and a voltage-adjusting portion 202'.

For example, defining the maximum value of the battery-pack information as $X_{max}$ and information about the target battery packs as $X_i$, the voltage-adjusting portion 202' sends instructions for turning on the switching elements 11 to the battery packs connected in parallel therewith, for which $X_{max}-X_i$ is equal to or greater than a predetermined threshold.

In addition, without limitation to the method described above, for example, when $X_{min}-X_i$ is equal to or greater than a predetermined threshold, where $X_{min}$ is the minimum value of the battery-pack information and $X_i$ is battery-pack information about target battery packs, the voltage-adjusting portion 202' may turn on the relevant switching elements 11. In addition, the switching elements 11 may be turned on when $X_i-X_{avr}$ is equal to or greater than a predetermined threshold, where $X_{avr}$ is the average of the battery packs.

When the decision portion 201 decides that a considerable voltage adjustment is to be performed, the voltage-adjusting portion 202' sends instructions for turning on the switching elements 11 connected parallel with the battery packs for which voltage adjustment is to be performed. Accordingly, closed circuits are formed in circuits connected in parallel with the battery packs for which voltage adjustment is to be performed, thereby making it possible to flow current in the bypass impedance elements 10.

As has been described above, with the power storage system according to this embodiment bypass impedance elements are individually connected in parallel with each of the battery packs, and the switching elements are provided in series with the bypass impedance elements. Accordingly, when the switching elements are turned on, the individual battery packs can quickly discharge.

In addition, because all charge/discharge control is performed via the power converters in the first embodiment described above, even when it is desirable to accelerate charging/discharging of the battery packs, it is conceivable that the charging/discharging current will end up restricted in accordance with the current range or output requirement instructions of the power converters. Even in such cases, however, by providing the bypass impedance elements in parallel with the individual battery packs, ideal battery conditions can be rapidly attained via power adjustment by the power converters in combination with discharge through the bypass impedance elements without putting a load on the power converters.

Note that, with the power storage system in this embodiment, the voltage-adjusting portion 202' controls the switching elements 11; however, it is not limited to this. For example, when the voltage difference is small and slight voltage adjustment is performed for each battery pack, the power converters 30 may be controlled while keeping the switching elements 11 in the off state.

Figure 4:
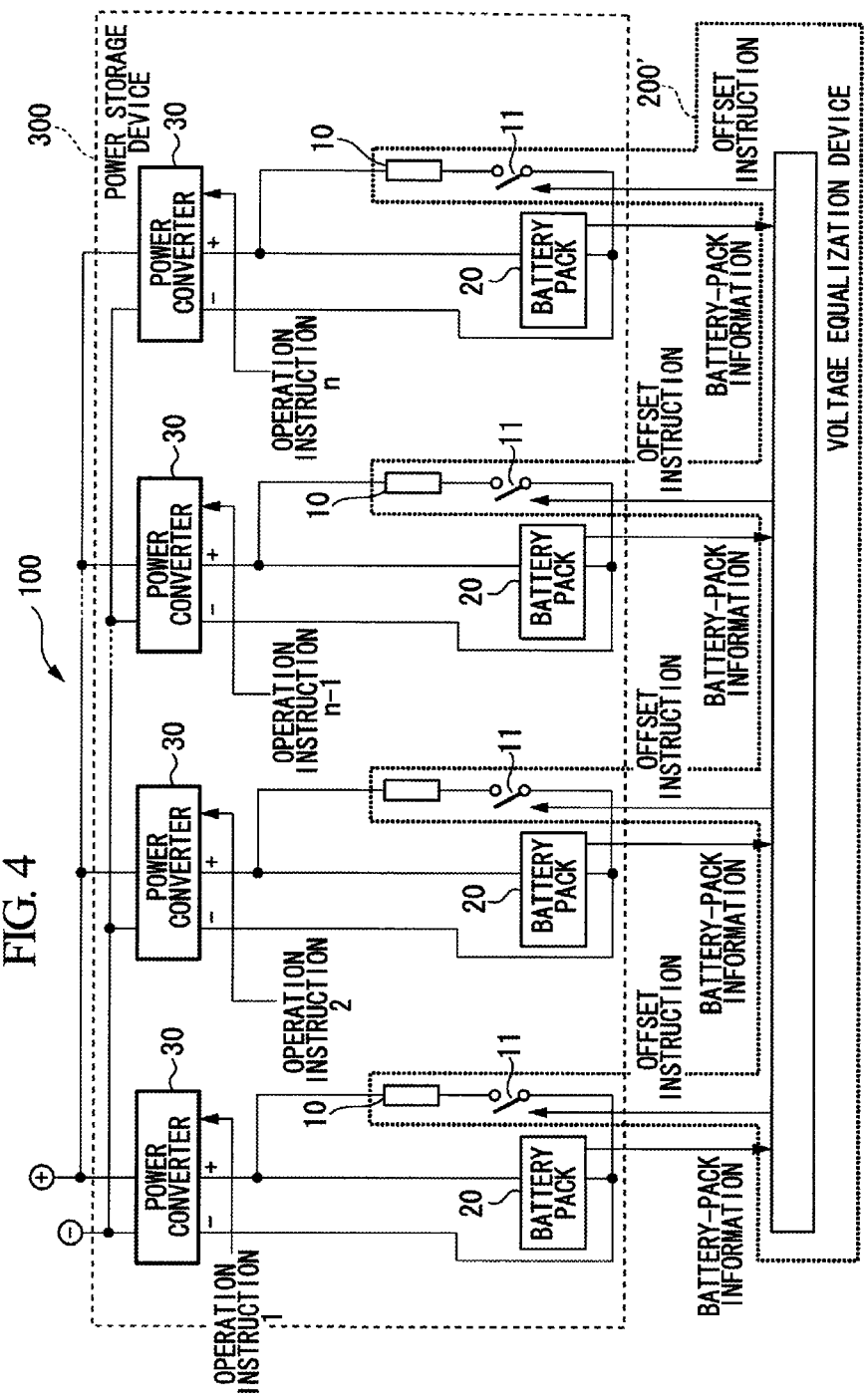
FIG. 4 is a block diagram showing, in outline, a power storage system according to a second embodiment of the present invention.

In addition, with the power storage system in this embodiment, when connecting the bypass impedance elements and the switching elements in series, although the bypass impedance elements are connected at positive sides of the power converters, and the switching elements are connected at negative sides of the power converters in FIG. 4, it is not limited to this. For example, the bypass impedance elements may be connected at the negative sides of the power converters, and the switching elements may be connected at the positive sides of the power converters.

In addition, with the voltage equalization device according to this embodiment, although the bypass impedance elements 10 and the switching elements 11 are individually provided in parallel for each of the battery packs in FIG. 4, it is not limited to this. For example, they may individually be provided for cells constituting the battery packs 20 or for cell groups formed by dividing the battery packs 20 into a plurality of groups.

Third Embodiment

Figure 5:
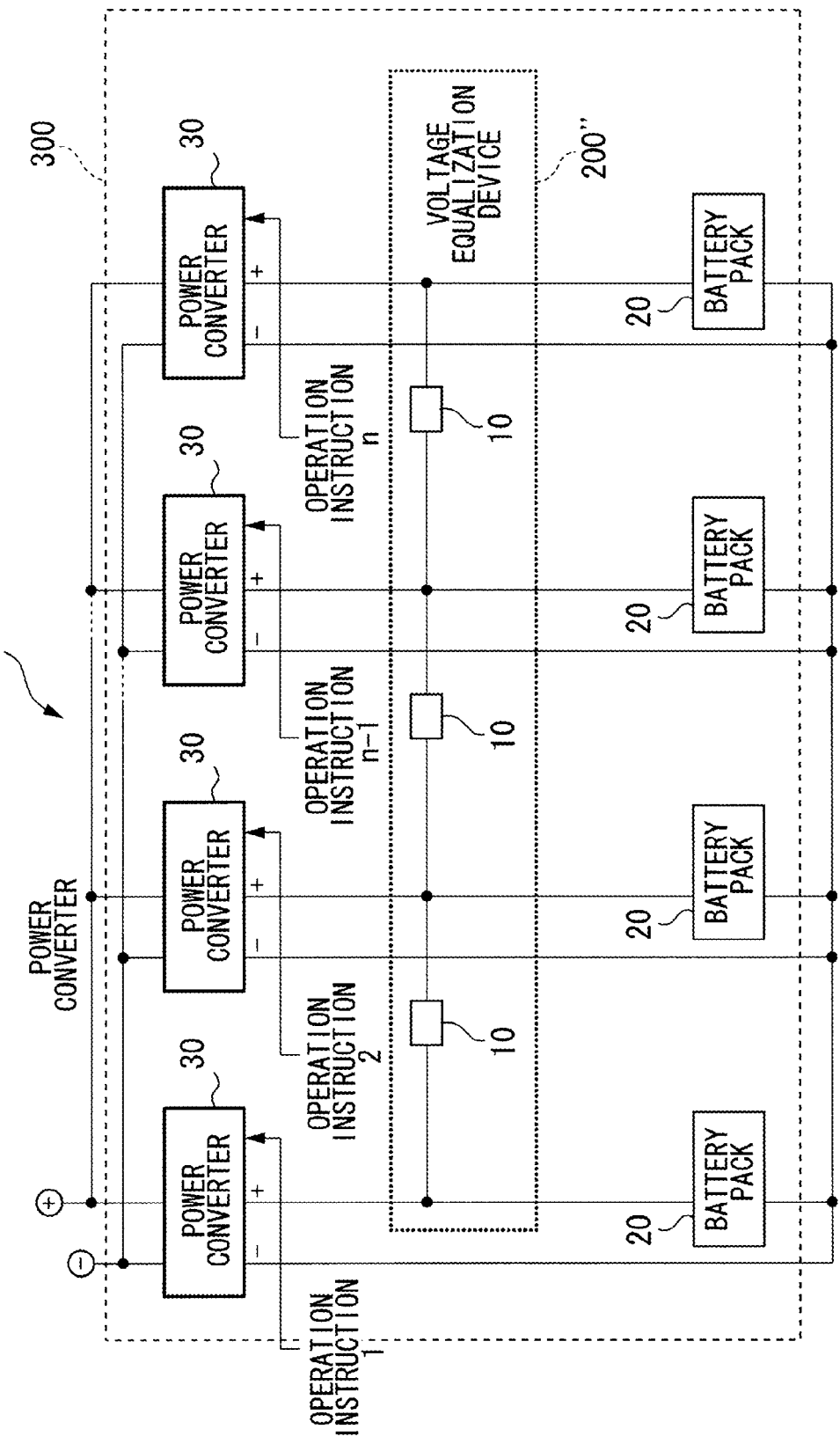
FIG. 5 is a block diagram showing, in outline, a power storage system according to a third embodiment of the present invention.
Figure 6:
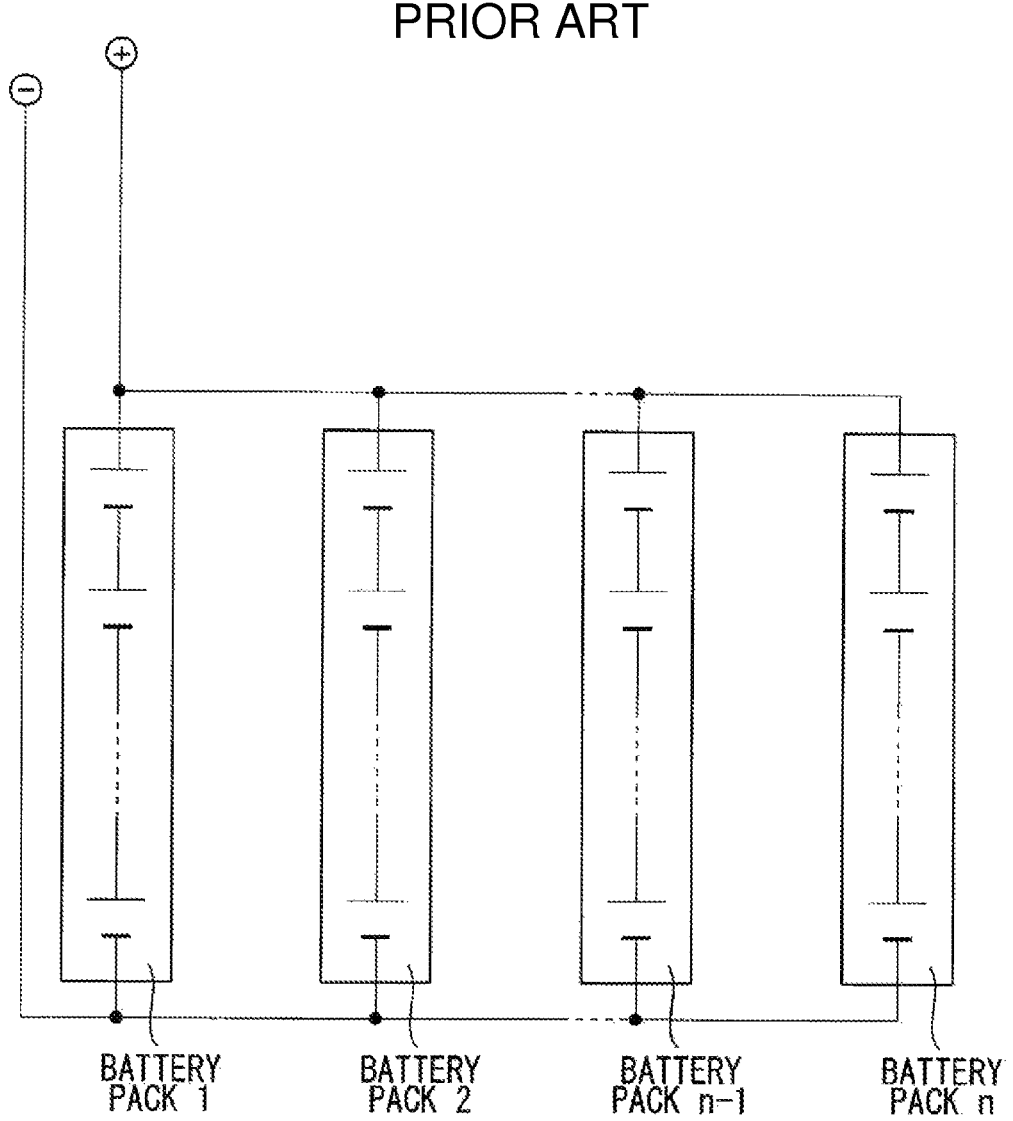
FIG. 6 is a diagram showing, in outline, conventional battery packs.
Figure 7:
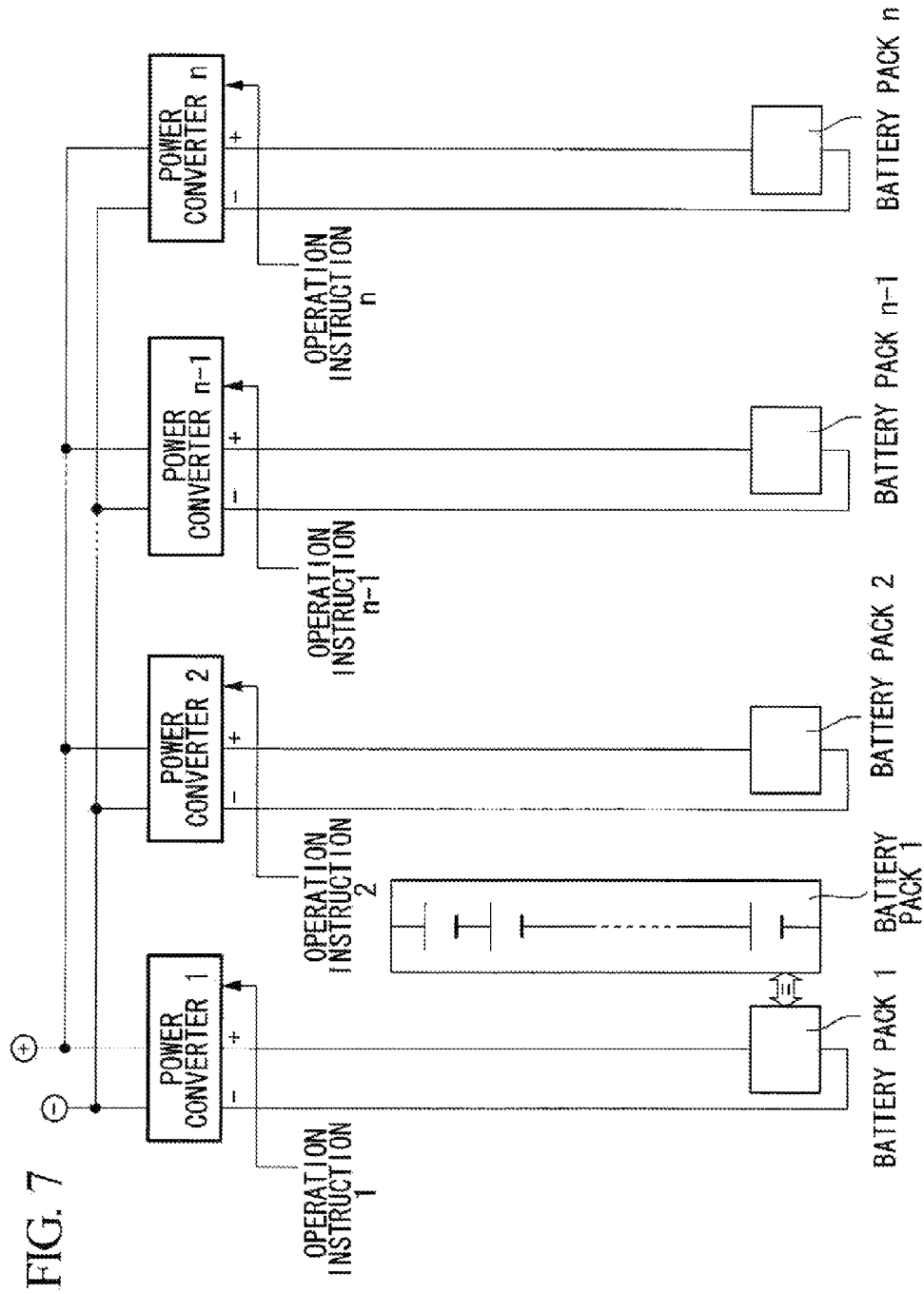
FIG. 7 is a diagram showing, in outline, the conventional battery packs connected by using power converters.

Next, a third embodiment of the present invention will be described using FIG. 5.

A voltage equalization device of this embodiment differs from the ones in the first and second embodiments in that a voltage equalization device 200" is provided instead of the voltage equalization device 200. In the voltage equalization device 200", of the battery packs 20 in which a plurality of secondary cells are connected, an impedance element 10 is provided in parallel between one of the battery packs 20 and the other battery packs other than the one battery pack 20.

With the impedance element 10 of the voltage equalization device 200", when there are battery packs with higher voltages among the individual battery packs, current flows from the battery packs with higher voltages to the battery packs with lower voltages.

In this way, by flowing the current among the individual battery packs via the impedance element 10, voltage differences can be eliminated among battery packs connected to the impedance element 10 through which the current has flowed.

Modification 1

With the voltage equalization device 200" according to this embodiment, the impedance element 10 is provided between one of the battery packs 20 and the other battery packs other than the one battery pack 20; however, it is not limited to this. For example, of the plurality of the battery packs 20, adjacent battery packs may be connected in parallel with each other via impedance elements and two battery packs located at both ends may be connected in parallel via an impedance element.

In this way, of the plurality of the battery packs 20, adjacent battery packs are connected in parallel with each other via the impedance elements and the two battery packs located at both ends may be connected in parallel via an impedance element; therefore, the battery packs can be connected in a ring-like manner via the impedance elements. Accordingly, as compared with connecting one battery pack with the other battery packs via an impedance element, the number of current routes communicating from high-voltage battery packs to low-voltage battery packs can be increased, thereby making it possible to enhance the efficiency of the voltage equalization.

Modification 2

With the voltage equalization device 200" according to this embodiment, the impedance element 10 is provided between one of the battery packs 20 and the other battery packs other than the one battery pack 20; however, it is not limited to this. For example, of the plurality of the battery packs 20, the battery packs that are not adjacent to each other may be connected in parallel via impedance elements.

Because battery packs among the plurality of the battery packs that are not adjacent to each other are connected in parallel via the impedance elements in this way, the number of current routes communicating from high-voltage battery packs to low-voltage battery packs can be further increased, and thus, it becomes possible to further enhance the efficiency of the voltage equalization.

Modification 3

With the voltage equalization device 200" according to this embodiment, the impedance elements 10 are provided between the individual battery packs; however, it is not limited to this. For example, switching elements 11 may be provided in series with the impedance elements 10, and switching controllers that control the switching elements 11 may be provided.

In this way, the switching elements are turned on based on the respective items of battery-pack information obtained from the individual battery packs, thereby making it possible to perform charging/discharging of the battery packs 20 via the impedance elements. Accordingly, it becomes possible to selectively perform charging/discharging of the battery packs 20 via the impedance elements.

REFERENCE SIGNS LIST 10 bypass impedance element
11 switching element
20 battery pack
30 power converter
40 controller
100 power storage system
200 voltage equalization device
201 decision portion
202 voltage-adjusting portion

The invention claimed is:
1. A voltage equalization device for a power storage device which includes a plurality of battery packs and a plurality of power converters and in which the plurality of battery packs are connected in parallel via each of the plurality of power converters, the plurality of power converters being respectively associated with the plurality of battery packs and performing voltage adjustment for the respectively associated battery packs, the voltage equalization device comprising:
deciding means for obtaining battery-pack information which is information regarding states of charge/discharge of each of the plurality of battery packs and for deciding, for each of the plurality of battery packs, whether or not the difference between the value indicated by the obtained battery-pack information and a previously-determined value as a reference value of the battery-pack information is equal to or more than a predetermined threshold;
a plurality of bypass impedance elements that are respectively connected in parallel with the plurality of battery packs;
a plurality of switching elements that are respectively associated with the plurality of battery packs and that are respectively connected in series with the plurality of bypass elements;
first voltage-adjusting means for causing each of the plurality of power converters to perform voltage adjustment; and second voltage-adjusting means for controlling each of the plurality of switching elements, wherein the second voltage-adjusting means turns on one of the plurality of switching elements associated with one of the plurality of battery packs for which the deciding means has decided that the difference is equal to or more than the predetermined threshold;

the first voltage-adjusting means causes the power converter associated with the one of the plurality of battery packs to perform voltage adjustment;

the second voltage-adjusting means turns off another one of the plurality of switching elements associated with another one of the plurality of battery packs for which the deciding means has decided that the difference is less than the predetermined threshold; and the first voltage-adjusting means causes the power converter associated with the another one of the plurality of battery pack to perform voltage adjustment.

2. A voltage equalization device for a power storage device which includes a plurality of battery packs and a plurality of power converters and in which the plurality of battery packs are connected in parallel via each of the plurality of power converters, the plurality of power converters being respectively associated with the plurality of battery packs and performing voltage adjustment for the respectively associated battery packs, the voltage equalization device comprising:

deciding means for obtaining battery-pack information which is information regarding states of charge/discharge of each of the plurality of battery packs and for deciding, for each of the plurality of battery packs, whether or not the difference between the value indicated by the obtained battery-pack information and a previously-determined value as a reference value of the battery-pack information is equal to or more than a predetermined threshold;

a plurality of bypass impedance elements that are provided for individual unit cells constituting the battery packs or for each cell group formed by dividing the battery packs into a plurality of groups, a plurality of switching elements that are respectively associated with the plurality of battery packs and that are respectively connected in series with the plurality of bypass elements;

first voltage-adjusting means for causing each of the plurality of power converters to perform voltage adjustment; and second voltage-adjusting means for controlling each of the plurality of switching elements, wherein the second voltage-adjusting means turns on one of the plurality of switching elements associated with one of the plurality of battery packs for which the deciding means has decided that the difference is equal to or more than the predetermined threshold;

the first voltage-adjusting means causes the power converter associated with the one of the plurality of battery packs to perform voltage adjustment;

the second voltage-adjusting means turns off another one of the plurality of switching elements associated with another one of the plurality of battery packs for which the deciding means has decided that the difference is less than the predetermined threshold; and the first voltage-adjusting means causes the power converter associated with the another one of the plurality of battery pack to perform voltage adjustment.

3. The voltage equalization device according to claim 1, wherein the first voltage-adjusting means generates, for each of the plurality of power converters, offset instructions for adjusting the states of charge/discharge on the basis of results of the decision by the deciding means; and the plurality of power converters adjust the states of charge/discharge on the respectively associated battery packs on the basis of the offset instruction generated by the first voltage-adjusting means.

4. A voltage equalization method in a voltage equalization device for a power storage device which includes a plurality of battery packs and a plurality of power converters which are respectively associated with the plurality of battery packs and which perform voltage adjustment for the respectively associated battery packs, and in which the plurality of battery packs are connected in parallel via each of the plurality of power converters, the voltage equalization device including a plurality of bypass impedance elements that are provided for individual unit cells constituting the battery packs or for each cell group formed by dividing the battery packs into a plurality of groups and a plurality of switching elements that are respectively associated with the plurality of battery packs and that are respectively connected in series with the plurality of bypass elements, the method comprising:

an obtaining step of obtaining battery-pack information which is information regarding states of charge/discharge of each of the plurality of battery packs;

a deciding step of deciding, for each of the plurality of battery packs, whether or not the difference between the value indicated by the obtained battery-pack information and a previously-determined value as a reference value of the battery-pack information is equal to or more than a predetermined threshold;

a first voltage-adjusting step of turning on one of the plurality of switching element associated with one of the plurality of battery packs for which the deciding step has decided that the difference is equal to or more than the predetermined threshold and causing the power converter associated with the one of the plurality of battery packs to perform voltage adjustment; and a second voltage-adjusting step of turning off another one of the plurality of switching elements associated with another one of the plurality of battery packs for which the deciding step has decided that the difference is less than the predetermined threshold and causing the power converter associated with the another one of the plurality of battery packs to perform voltage adjustment.

* * * * *